June 29, 1965  P. E. ODOR  3,191,771
SORTING APPARATUS
Filed July 25, 1963  2 Sheets-Sheet 2
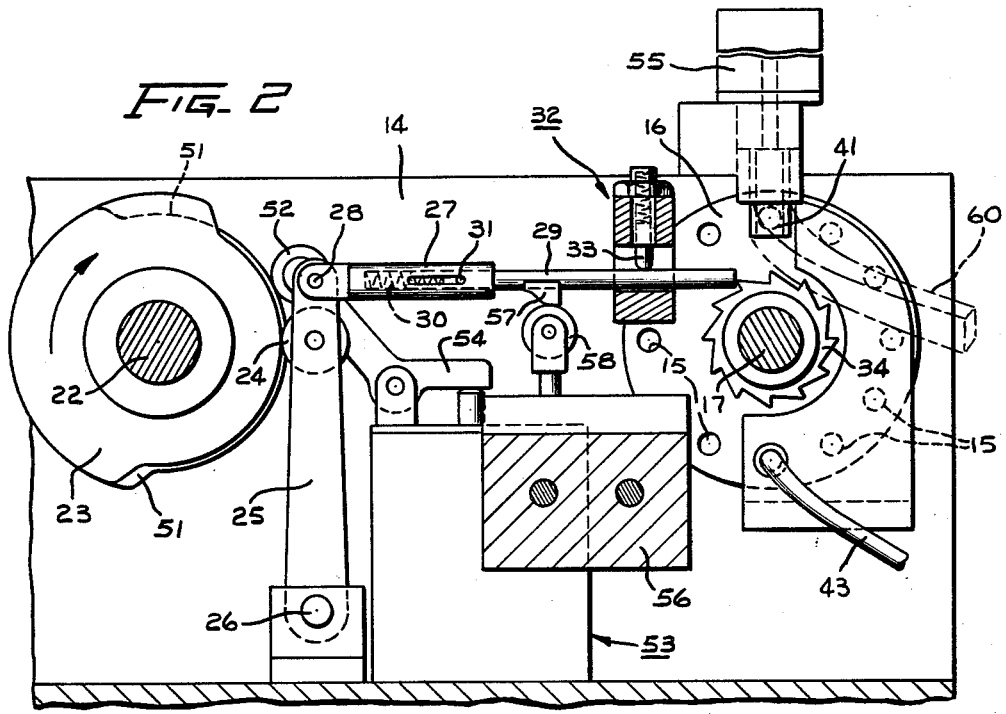
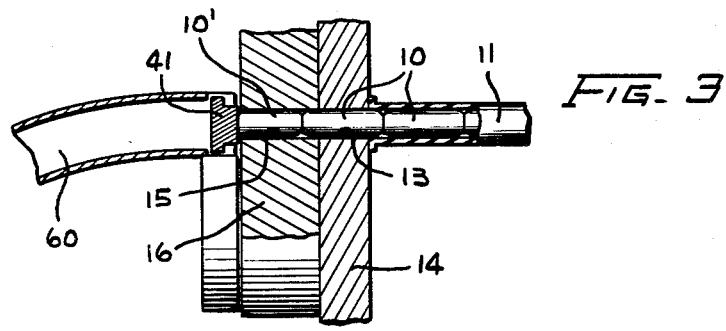
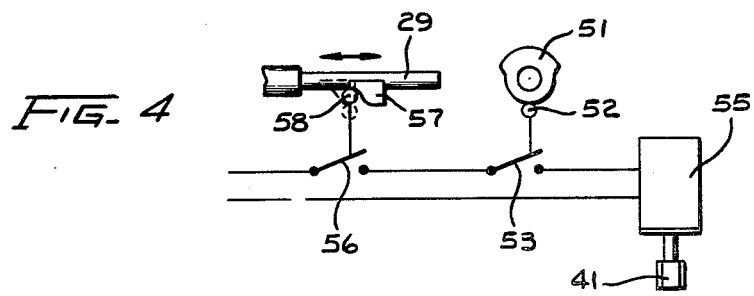

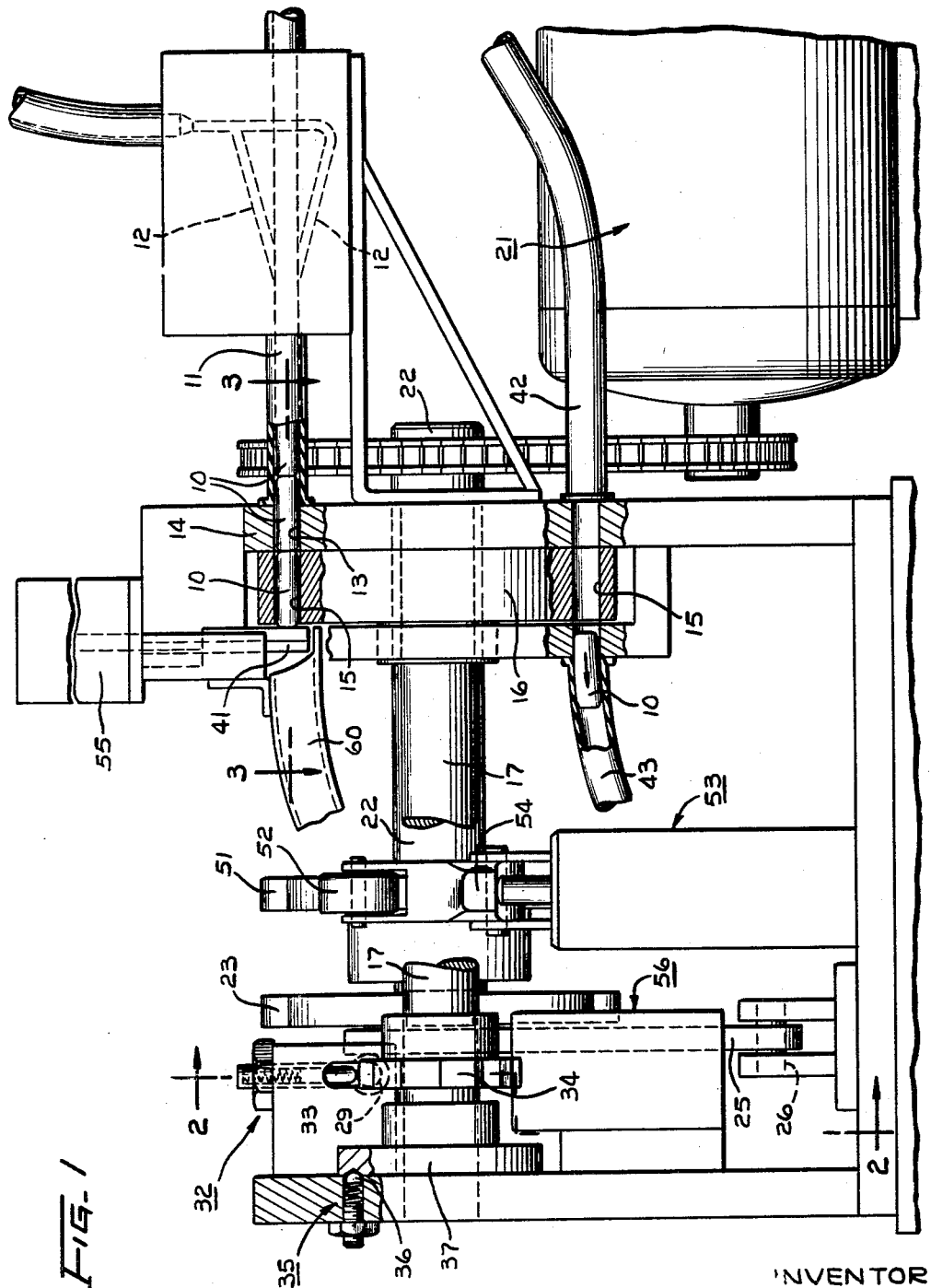

United States Patent Office 3,191,771
Patented June 29, 1965

3,191,771
SORTING APPARATUS
Paul E. Odor, Oklahoma City, Okla., assignor to Western Electric Company, Incorporated, New York, N.Y., a corporation of New York
Filed July 25, 1963, Ser. No. 297,558
6 Claims. (Cl. 209—80)

This invention relates to apparatus for separating articles having one dimension of desired value from similar articles whose corresponding dimension is of improper value. It is an object of the invention to provide improved apparatus of this character.

Manufactured articles frequently have a critical dimension which is subject to substantial variation due to manufacturing methods. As an example, plastic tubing may be cut to form short sleeves of specified length but, due to faulty operation of the cutting machine, an occasional sleeve may be of improper length. In particular, a sleeve is likely to be cut too short. If the length of the sleeve is critical it is then desirable that the sleeves of proper length be separated from those which are of improper length.

It is another object of the invention to provide an improved apparatus for detecting the value of a critical dimension of a succession of articles and for separating the articles of desired dimension from the articles of improper dimension.

Another object of the invention is to provide improved apparatus of the character described above which is simple in construction and reliable in operation.

In accordance with a preferred embodiment of the present invention a succession of articles is fed through a passage and into successive openings in a rotary disc. An article within the rotary disc engages an abutment which is so positioned that the trailing end of the article, if it is of proper dimension, is located between the exit end of the passage and the facing surface of the disc. Articles of proper dimension may, therefore, be moved laterally away from the passage by rotation of the disc and subsequently ejected from the disc. When an article is inserted into the disc which is of improper dimension, either that article or the succeeding article will extend into both the passage and the opening in the disc. This interrupts rotation of the disc and provides an indication that the article within the disc is of improper dimension. Preferably, controls are provided for retracting the abutment to permit ejection of the article of improper dimension such that it is separated automatically from the articles of proper dimension.

This invention, together with further objects and advantages thereof, will best be understood by reference to the following description taken in connection with the accompanying drawings, in which FIG. 1 is an elevational view, partially in cross section, of apparatus illustrating one embodiment of the invention;

FIG. 2 is a cross-sectional view taken along the line 2—2 of FIG. 1;

FIG. 3 is a cross-sectional view taken along the line 3—3 of FIG. 1 and illustrating the detection and separation of an article of improper length, and FIG. 4 is a simplified showing of control circuitry employed in the apparatus of FIG. 1.

The illustrated apparatus is particularly designed to sort sleeves 10 which comprise short lengths of plastic tubing and are intended for the encapsulation of electrical components. Because of the nature of the apparatus which cuts the tubing to form the sleeves 10, it is highly improbable that a sleeve will be of excessive length, while it is frequently the case that a sleeve will be too short for satisfactory use. Accordingly, the machine is particularly adapted to the separation of sleeves of proper length from sleeves which are too short. Similar apparatus, and in fact the same apparatus, may be employed, however, to separate sleeves of proper length from sleeves which may be either too long or too short.

In the illustrated embodiment of the invention, sleeves 10 are conveyed through a tube 11 in abutting, end-to-end relationship. They are propelled by an air jet produced by nozzles 12 as is conventional in the handling of lightweight articles.

The sleeves are carried through a passage 13 in a fixed plate 14 and into an aligned opening 15 in a disc 16. The disc 16 is secured to a shaft 17 and is indexible to bring successive ones of a plurality of openings 15 into alignment with the passage 13.

Power for indexing the disc 16 is derived from a motor 21 which acts through a suitable belt and pulley arrangement, as shown, to drive a cam shaft 22. A cam 23 is secured to the shaft 22 and engages a cam follower 24 as best seen in FIG. 2. The cam follower 24 is mounted near the free end of a lever 25 which is pivoted on the base of the machine as by a pin 26.

A sleeve 27 is pivotally secured to the free end of the lever 25 through a pin 28 and slidably receives a rod 29 therein. A spring 30 is arranged within the sleeve 24 and urges the rod 29 outward of the sleeve 27 or to the right in FIG. 2. A pin 31 which is set in the left-hand end of the rod 29 is received within slots in the sides of the sleeve 27, as shown, to limit outward movement of the rod with respect to the sleeve.

The right-hand portion of the rod 29 is guided by an assembly 32 which includes a spring-biased pin 33 and accommodates a slight rocking movement of the rod 29. The free end of the rod 29 is thus aligned to bear against successive teeth on a ratchet wheel 34 which is secured to the shaft 17. A detent mechanism 35 (see FIG. 1) is provided for releasably maintaining the disc 16 in any one of the positions wherein an opening 15 is aligned with the passage 13. The detent mechanism includes a spring-biased ball 36 which partially enters suitably positioned depressions in a disc 37 which is secured to the shaft 17.

It will now be apparent that upon each revolution of the cam 23, the push rod 29 is driven to the right to index the ratchet wheel 34 and the disc 16, and then retracts to the left in preparation for a subsequent indexing cycle. The spring 30 is of sufficient stiffness that it will index the disc 16 as long as there is no significant obstruction to such movement.

When the disc 16 is indexed to bring an opening 15 into alignment with the passage 13, the air jet forces the line of sleeves 10 forward such that a sleeve enters the newly presented opening 15. The sleeve advances until it strikes a stop 41 which is arranged in alignment with the passage 13 and on the opposite side of the disc 16 from the passage 13.

Normally the stop 41 remains in the position illustrated in FIG. 1 wherein it limits the advancement of a sleeve 10. If the sleeve 10 which enters the opening 15 in the disc 16 is of the proper length its trailing end lies between the facing surfaces of the disc 16 and the plate 14. Under these circumstances, the disc 16 is unimpeded and may readily be advanced by the indexing apparatus described above. After several indexing operations, a sleeve 10 reaches the lowermost position at which an air blast through a tube 42 ejects the sleeve 10 through a tube 43. The tube 43 directs the sleeve into a suitable container.

When a sleeve 10' (FIG. 3) which is substantially shorter than the desired length enters the uppermost opening 15 in the disc 16, the succeeding sleeve 10 extends beyond the face of the plate 14 and into the opening 15 in the disc 16. The extending of the succeeding sleeve 10 into both the passage 13 and the opening 15 obstructs further indexing of the disc 16. The spring 30 of FIG. 2 is made sufficiently soft that it yields during the indexing cycle in the event that a sleeve 10 extends into both the passage 13 and the opening 15.

Control apparatus is provided for retracting the stop 41 when indexing of the disc 16 is thus interrupted. A second cam 51 is secured to the cam shaft 22. As shown in FIG. 2, the cam 51 engages a cam follower 52 which operates a pressure switch 53 through a bell crank 54. The pressure switch 53 is in an electric circuit which controls a solenoid 55 which, when energized, raises the stop 41.

Also arranged in the control circuit for the solenoid 55 is another pressure switch 56 which is controlled by the indexing apparatus. More specifically, and as shown in FIG. 2, a cam 57 is secured to the rod 29 and normally depresses a cam follower 58 to close the switch 56. During a normal indexing operation, the cam 57 allows the cam follower 58 to rise such that the switch 56 opens during the indexing stroke of the rod 29. However, in the event that indexing is obstructed, the cam 57 does not allow the cam follower 58 to rise and, therefore, maintains the switch 56 closed.

The circuitry for controlling the solenoid 55, and hence the stop 41, may be seen best in FIG. 4. During a normal operating cycle, the switch 56 is opened by the indexing stroke of the rod 29, following which the cam 51 closes the switch 53. In the latter portion of the indexing cycle the cam 51 allows the switch 53 to open, following which the switch 56 is reclosed by the return stroke of the rod 29. It will be apparent that the control circuit for the solenoid 55 is at no time completed during a normal cycle of the indexing apparatus.

In the event that indexing of the disc 16 is obstructed in the manner illustrated in FIG. 3, the rod 27 does not advance and the switch 56 remains closed throughout the cycle. Accordingly, the solenoid 55 is energized for the period of time that the cam 51 maintains the switch 53 closed.

When the solenoid 55 is energized, the stop 41 is raised out of alignment with the passage 13 and the aligned opening 15. The cam 51 maintains the solenoid 55 energized and the stop 41 raised for a long enough period of time that the air jet from the nozzle 12 may eject the short sleeve 10' from the opening 15 and through a duct 60 to a reject bin or container.

The succeeding sleeve 10 is trapped by the light shearing action of the disc 16 and the plate 14 such that advancement of any of the succeeding sleeves 10 into the duct 60 is prevented. As indicated above in connection with FIG. 4, the solenoid 55 is deenergized and the stop 41 returns to its normal position before the cam 23 releases pressure on the spring 30, the ratchet wheel 34 and the disc 16. After the stop returns, the removal of the torque applied to the disc 16 permits the succeeding sleeve 10 to advance into the same opening 15 from which the short sleeve 10' was ejected into the reject bin.

As indicated above, the illustrated apparatus is particularly adapted to the separating of articles of proper length from articles which are of shorter length. This follows from the fact that a sleeve of shorter length is ejectable through the duct 60 automatically, whereas sleeves of proper length are ejected through the tube 43. If circumstances are such that an occasional sleeve of excess length were presented to the apparatus, that sleeve will also interrupt the indexing operation since that sleeve, when it enters an opening 15 in the disc 16, will extend into the passage 13. Such a sleeve is not automatically ejectable through the duct 60 since it will be trapped by the shearing action of the disc 16 and the plate 14. Attention is directed to the fact that the present invention in its broader concept does not necessarily include automatic ejection of a sleeve of improper length. Either a short sleeve or a long sleeve will cause interruption of the indexing operation and serve as an indication that a sleeve of improper length has entered the opening 15 opposite the passage 13. The faulty sleeve may then be removed in any desired manner, including manually. Accordingly, the invention in its broad concept serves to separate articles of proper length from defective articles which are either too long or too short. In either case, the light shearing action of the disc 16 and the plate 14 isolates and thus separates the defective part by virtue of the fact that an article of improper length results in either that article or the succeeding article extending into both the opening 15 and the passage 13 and thereby interrupting the indexing operation.

In the illustrated embodiment of the invention the facing surfaces of the disc 16 and the plate 14 may be substantially in contact, the flexibility of the ends of the sleeves 10 providing a reasonable tolerance in the length of acceptable sleeves. Where relatively rigid articles are to be sorted, it will be apparent that tolerance in the length of acceptable articles can be provided by spacing the facing surfaces of the disc and plate apart by a distance equal to the desired tolerance.

The member which defines the openings 15 has been shown as a rotary disc. It will be apparent that this member may alternatively be a reciprocating slide in which two openings are alternatively brought into alignment with the passage 13. In this case, sleeves of proper length may be ejected from the alternative openings after they have moved to opposite sides of the passage 13. Short sleeves still may be ejected automatically from an opening while it remains in alignment with the passage 13.

While the illustrated embodiment of the invention separates articles in accordance with their length, it will be apparent that the critical dimension may be one of the lesser dimensions of the articles. In the suggested indexing apparatus, the yieldable member is the reciprocating assembly consisting essentially of the sleeve 27, the rod 29 and the spring 30. In this case, the spring is compressed during the first half of an obstructed cycle and is released durring the second half of the cycle. Among various alternatives, a slip clutch may comprise the yielding portion of the indexing apparatus. In such case, and if automatic ejection of a faulty part is desired, slipping of the clutch may be made to initiate a signal to actuate the solenoid 55.

Accordingly, while various embodiments of the invention have been disclosed, many modifications will be apparent, and it is intended that the invention be interpreted as including all modifications which fall within the true spirit and scope of the invention.

What is claimed is:

1. Apparatus for separating articles having one dimension of desired value from articles whose corresponding dimension is of improper value comprising:

means defining a passage for a single line of such articles with each article having its critical dimension extending longitudinally of the passage, means for urging a succession of articles along the passage in abutting relationship, a movable member having a plurality of openings therein, said movable member being arranged closely adjacent the exit end of said passage defining means and being so positioned that different ones of said openings may be brought into alignment with the passage to receive an article therefrom, retractable stop means positioned in alignment with said passage for limiting the advancement of successive articles from the passage into said openings such that the trailing end of an article of desired dimension lies between said movable member and the exit end of said passage defining means when the article is in engagement with said stop means, whereby an article will extend into both said passage defining means and said movable member when an article of improper dimension abuts said stop means, and means for indexing said movable member to bring said opening successively into alignment with the passage whereby articles of proper dimension may be re-received in said openings, carried beyond said passage and ejected from said movable member, and each article of improper dimension received in the opening in alignment with said passage may be ejected therefrom upon the retracting of said stop means before said movable member is indexed to the next succeeding operating position, said indexing means including a yieldable member whereby insertion of an article of improper dimenison into one of said openings and the resulting extending of an article into both said passage defining means and said movable member causes said indexing means to yield and interrupts indexing of said movable member.

2. Apparatus for separating articles as specified in claim 1, wherein said movable member is rotatable about an axis extending substantially parallel to the length of the passage, said openings extend through said rotatable member, and said stop means is positioned adjacent the side of said rotatable member which is opposite said passage defining means.

3. Apparatus for separating articles having one dimension of desired value from articles whose corresponding dimension is of improper value comprising:

means defining a passage for a single line of such articles with each article having its critical dimension extending longitudinally of the passage;

means for urging a succession of articles along the passage in abutting relationship;

a movable member rotatable about an axis extending substantially parallel to the length of the passage and having a plurality of openings extending therethrough, said movable member being arranged closely adjacent the exit end of said passage defining means and being so positioned that different ones of said openings may be brought into alignment with the passage to receive an article therefrom;

retractable stop means positioned in alignment with said passage for limiting the advancement of successive articles from the passage into said openings such that the trailing end of an article of desired dimension lies between said movable member and the exit end of said passage defining means when the article is in engagement with said stop means, whereby an article will extend into both said passage defining means and said movable member when an article of improper dimension abuts said stop means, and means for indexing said movable member to bring said openings successively into alignment with the passage whereby articles of proper dimension may be received in said openings, carried beyond said passage and ejected from said movable member, said indexing means including a yieldable member whereby insertion of an article of improper dimension into one of said openings and the resulting extending of an article into both said passage defining means and said movable member causes said indexing means to yield and interrupt indexing of said movable member, and control means responsive to yielding of said indexing means to cause retraction of said stop means and to permit ejection of the article arranged within the opening which is in alignment with the passage.

4. Apparatus for separating articles having one dimension of desired value from articles whose corresponding dimension is of improper value comprising:

means defining a passage for a single line of such articles with each article having its critical dimension extending longitudinally of the passage, means for urging a succession of articles along the passage in abutting relationship, a rotary member having a plurality of openings therein, said rotary member being arranged closely adjacent the exit end of said passage defining means and being so positioned that successive ones of said openings may be brought into alignment with the passage to receive an article therefrom, retractable stop means positioned in alignment with said passage for limiting the advancement of successive articles from the passage into said openings such that the trailing end of an article of desired dimension lies between said rotary member and the exit end of said passage defining means when the article is in engagement with said stop means, whereby an article will extend into both said passage defining means and said rotary member when an article of improper dimension abuts said stop means, and means for indexing said rotary member to bring said openings successively into alignment with the passage whereby articles of proper dimension may be received in said openings, carried beyond the passage and ejected from said rotary member, and each article of improper dimension received in the opening in alignment with said passage may be ejected therefrom upon the retracting of said stop means before said rotary member is indexed to the next succeeding operating position, said indexing means including a resilient reciprocating member whereby insertion of an article of improper dimension into one of said openings and the resulting extending of an article into both said passage defining means and said rotary member causes said indexing means to yield and interrupts indexing of said rotary member.

5. Apparatus for separating articles having one dimension of desired value from articles whose corresponding dimension is of improper value comprising:

means defining a passage for a single line of such articles with each article having its critical dimension extending longitudinally of the passage, means for urging a succession of articles along the passage in abutting relationship, a rotary member having a plurality of openings therein, said rotary member being arranged closely adjacent the exit end of said passage defining means and being so positioned that successive ones of said openings may be brought into alignment with the passage to receive an article therefrom, stop means for limiting the advancement of articles from the passage into said openings such that the trailing end of an article of desired dimension lies between said rotary member and the exit end of said passage defining means when the article is in engagement with said stop means, whereby an article will extend into both said passage defining means and said rotary member when an article of improper dimension abuts said stop means, and means for indexing said rotary member to bring said openings successively into alignment with the passage whereby articles of proper dimension may be received in said openings, carried beyond the passage and ejected from said rotary member, said indexing means including a positively driven drive element, pawl and ratchet means, and a reciprocating link connecting said drive element and said pawl and ratchet means, said reciprocating link being resiliently compressible whereby said drive element may continue operation through a complete cycle without actuation of said pawl and ratchet means when an article of improper dimension is inserted into one of said openings with resulting extending of an article into both said passage defining means and said rotary member.

6. Apparatus for separating articles of desired length from articles of shorter length comprising:

means defining a passage for a single, end-to-end line of such articles, means for producing an air jet for urging a succession of articles along the passage in abutting relationship, a rotary member having a plurality of openings extending axially therethrough, said rotary member being arranged closely adjacent the exit end of said passage defining means and being so positioned and oriented that successive ones of said openings may be brought into alignment with the passage to receive an article therefrom, stop means arranged in alignment with the passage and adjacent the side of said rotary member opposite said passage defining means for limiting the advancement of articles from the passage into said openings such that the trailing end of an article of desired length lies between said rotary member and the exit end of said passage defining means when the article is in engagement with said stop means, whereby a succeeding article will extend into both said passage defining means and said rotary member when a short article abuts said stop means, means for indexing said rotary member to bring said openings successively into alignment with the passage whereby articles of proper length may be received in said openings, carried beyond said passage and ejected from said rotary member, said indexing means being resilient whereby insertion of a short article into one of said openings and the resulting extending of the succeeding article into both said passage defining means and said rotary member interrupts indexing of said rotary member, said stop means being retractable from effective article stopping positions, and control means responsive to entry of a short article into an opening and consequent yielding of said indexing means to cause retraction of said stop means, whereby the air jet produced by said urging means may eject the short article from the opening while in alignment with the passage.

References Cited by the Examiner

UNITED STATES PATENTS

| | | |
|---|---|---|
| 2,115,464 | 4/38 | Kirby. |
| 2,186,693 | 1/40 | Bradbury _____ 209—82 |
| 2,340,465 | 2/44 | Gerlach _____ 192—150 |
| 3,008,578 | 11/61 | Clough _____ 209—88 |
| 3,034,645 | 5/62 | Groppe. |
| 3,089,732 | 5/63 | Gamberini _____ 302—2 |
| 3,148,775 | 9/64 | Briel et al. _____ 209—82 |

ROBERT B. REEVES, *Acting Primary Examiner.*